United States Patent
McGaughey

(10) Patent No.: US 6,239,531 B1
(45) Date of Patent: May 29, 2001

(54) APPARATUS AND METHOD OF MECHANICALLY COMMUTATING A BRUSHLESS MOTOR

(75) Inventor: David Wilber McGaughey, West Chester, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/526,693

(22) Filed: Mar. 15, 2000

(51) Int. Cl.$^7$ ................................................. H02K 13/04
(52) U.S. Cl. ............................................. 310/233; 310/236
(58) Field of Search ........................... 310/67 R, 127, 310/128, 135, 231, 233, 234–236; 318/439, 254, 138; 324/207.16, 207.25, 173–174, 207.22

(56) References Cited

U.S. PATENT DOCUMENTS

| | | |
|---|---|---|
| 5,382,889 | 1/1995 | Peters et al. .......................... 318/254 |
| 5,534,763 | 7/1996 | Williams et al. ..................... 318/799 |
| 5,600,218 | 2/1997 | Holling et al. ........................ 318/439 |
| 5,783,917 | 7/1998 | Takekawa ............................. 318/439 |
| 5,796,248 | 8/1998 | Weber .............................. 324/207.16 |

*Primary Examiner*—Nestor Ramirez
*Assistant Examiner*—Tran Nguyen
(74) *Attorney, Agent, or Firm*—Swidler Berlin Shereff Friedman, LLP

(57) ABSTRACT

A commutation assembly mechanically commutates an electric motor. It includes a plurality of distinct electrical contacts forming a circular surface around a motor shaft. At least some of the electrical contacts are electrically coupled to distinct coils within the motor. The assembly further includes a conductive flexible ring and an arm with two rollers. The conductive flexible ring has a circumference that is less than the circumference of the circular surface. In use, the arm is rigidly attached to the motor shaft and has a roller disposed at a distal end for forcing an electrical connection between the flexible ring and specific electrical contacts during rotation of the arm. The electrical connection causes at least one of the distinct coils to be selectively energized.

20 Claims, 5 Drawing Sheets

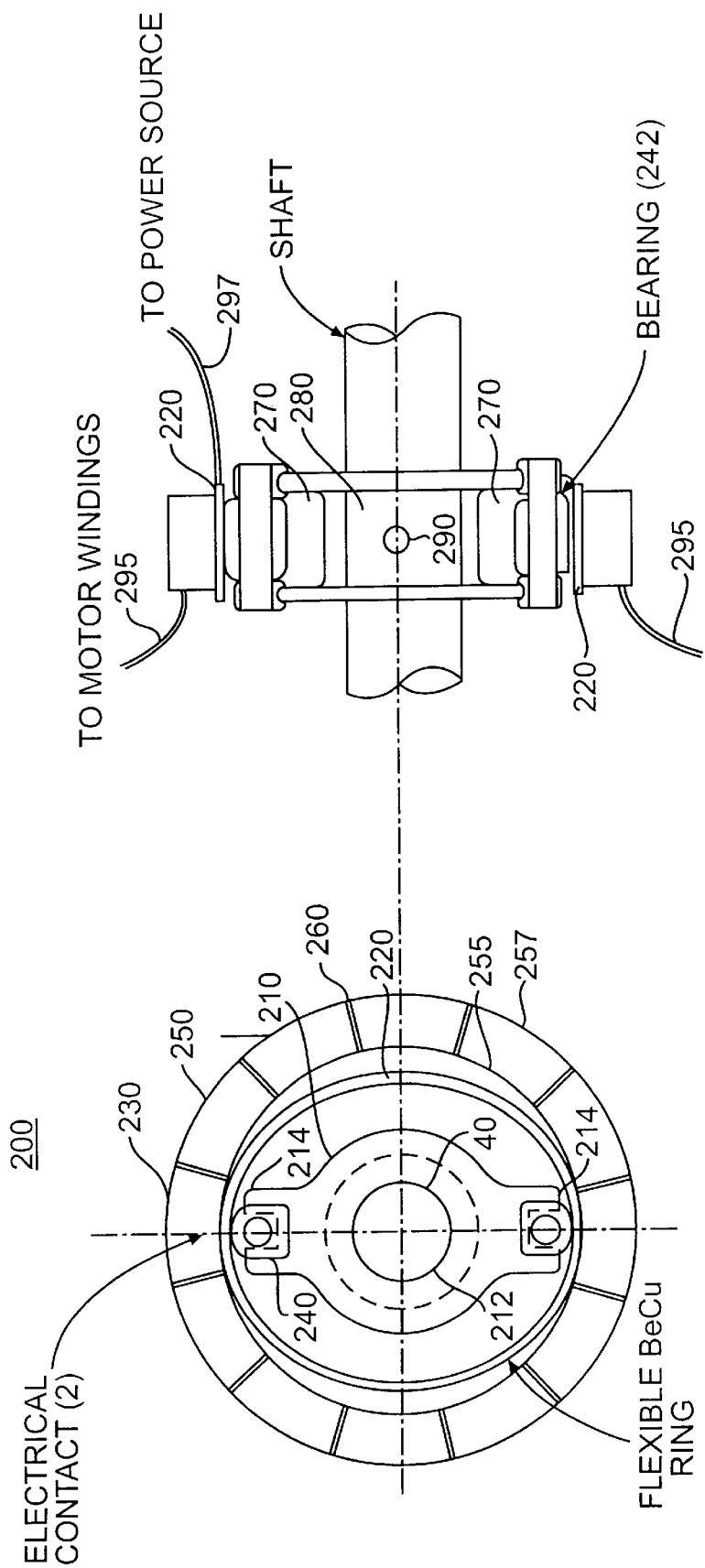

APPARATUS AND METHOD OF MECHANICALLY COMMUTATING A BRUSHLESS MOTOR

FIELD OF THE INVENTION

The present invention relates to electric motors and, more particularly, to an apparatus and method for mechanically commutating electric motors.

BACKGROUND OF THE INVENTION

Electric motors are nearly ubiquitous today and range from very small in size, such as those found in compact disk players, to very large such as those found in industrial applications. The type of motor, its size, power and control requirements all depend on the particular implementation.

In general, electric motors include a shaft, a rotor and a stator. Driving a workpiece may be as simple as connecting the shaft to a platen for spinning an object such as a compact disk in a compact disk player. Alternatively, the shaft may drive the workpiece through one or more gears or transmissions for imparting rotational force under desired torque conditions or for imparting translational force.

There are several different types of DC electric motors, including brush and brushless motors. In brush motors, the rotor includes coils called the armature which must be connected to a power source to create torque on the rotor. The connection of the rotor coils to the power source is made through brushes, typically carbon, which slide over a metal cylindrical surface that is part of the rotor. The stator includes either a fixed permanent magnet or fixed coils which exert torque on the rotor via the armature.

There are several problems associated with brush motors, most of which relate to application of power to the rotor through the brush itself. These problems include wear of the brush and rotor contact during use, arcing, resistance and heating at the brush-contact interface, and burning of the brush during temperature extremes.

In brushless motors, permanent magnets are implemented in the rotor instead of coils. The stator includes fixed coils that may be selectively energized to create torque on the rotor. Because the permanent magnets do not require connection to a power source, no brush is required. Thus, the problems associated with the brush-rotor contact interface are avoided. Brushless motors tend to be more reliable over time than brush motors and are ideal for aerospace applications.

All brushless electric motors must be commutated in order to create torque and rotation on the shaft. During commutation, one or more coils of the stator are momentarily energized in a rotating fashion around the axis of rotation of the rotor. Each energized coil creates a magnetic field which imparts electromotive force ("EMF") between the energized coil and a magnetic pole of the rotor. It is the selective energizing of the coils which imparts torque on the motor shaft.

Traditionally, commutation has been done electronically using electronic components. Electronic commutation is accomplished by using position sensors on the motor which determine the position of the rotor relative to the stator and a series of switches which energize the stator coils based on the rotor position. Electronic commutation is reliable but expensive and is difficult to implement when stator coil currents are high.

There is a need for a new commutation technique for brushless electric motors which does not require expensive electronics and which can handle high coil excitation currents. The technique needs to be inexpensive and reliable and should avoid problems associated with a brush-rotor contact interface.

SUMMARY OF THE INVENTION

According to the present invention, problems associated with sliding brush contacts, expensive electronics and current limited switches for exciting stator coils are avoided by mechanically commutating a brushless motor.

To accomplish mechanical commutation of the motor, one end of the stator coils is connected to a series of distinct contact elements arranged to have an inner cylindrical surface which makes electrical contact to achieve commutation. The electrical contact is made with a flexible cylindrical ring. Its outer diameter is slightly smaller than the diameter of the inner cylindrical surface of the stator contact elements. The electrical contact is made at two discreet points (180 degrees apart) by deforming the ring outward so that it contacts the stator elements. This is shown and described with reference to FIGS. 3A & 3B. Connected to the motor shaft is an arm with rollers at each end which deforms the flexible ring outward. The arm with the rollers is aligned with the permanent magnetic polls of the rotor.

The flexible ring is restrained by, for example, keys on the stator. These keys and the two rollers are to be electrically insulated to completely isolate the flexible ring. Because the flexible ring does not rotate, it can be connected to the external power source. Consequently, the stator coils are sequentially activated at the desired time to achieve commutation. Commutation is thus accomplished without electronically controlled switches and without reliability problems associated with a sliding electrical interface like a brush-contact interface.

In one embodiment, a commutation assembly for mechanically commutating a brushless electric motor includes a plurality of distinct electrical contacts forming a circular surface around a motor shaft. At least some of the electrical contacts are electrically coupled to distinct coils within the motor. The assembly further includes a conductive flexible ring and an arm. The conductive flexible ring has a circumference that is less than the circumference of the circular surface. The arm is for rigid attachment to the motor shaft and has a roller disposed at a distal end for forcing an electrical connection between the flexible ring and some of the electrical contacts during rotation of the arm. The electrical connection causes at least one of the distinct coils to be selectively energized.

The roller may make substantially non-sliding contact with the flexible ring. In some embodiments it may be a bearing assembly while in others it may be a pin and wheel assembly such as a bushing. The conductive flexible ring may be made of beryllium copper and may be coupled to a source of electrical power.

A method of commutating a brushless electric motor according to one embodiment of the invention includes the steps of providing, coupling and attaching. In a providing step, a plurality of distinct electrical contacts are provided to form a circular surface around a motor shaft. In the coupling step at least some of the electrical contacts are coupled to distinct coils within the motor. In another providing step, a conductive flexible ring is provided having a circumference that is less than the circumference of the circular surface. In the attaching step an arm is attached to the motor shaft. The arm has a roller disposed at a distal end for forcing an electrical connection between the flexible ring and some of the electrical contacts during rotation of the arm. This causes at least one of the distinct coils to be selectively energized during motor operation and therefore commutation of the motor.

BRIEF DESCRIPTION OF THE FIGURES

The aforementioned features and advantages of the present invention will be more fully appreciated with reference to the detailed description and the drawing figures in which:

FIG. 3a depicts a cross-sectional view perpendicular to the motor shaft of the mechanical commutation assembly and its disposition relative to the shaft according to an embodiment of the present invention.

FIG. 3b depicts a cross-sectional view along the axis of the motor shaft of the mechanical commutation assembly according to an embodiment of the present invention which illustrates the electrical connection to the motor coils.

DETAILED DESCRIPTION
Electronic Commutation of the Prior Art

Figure 1:
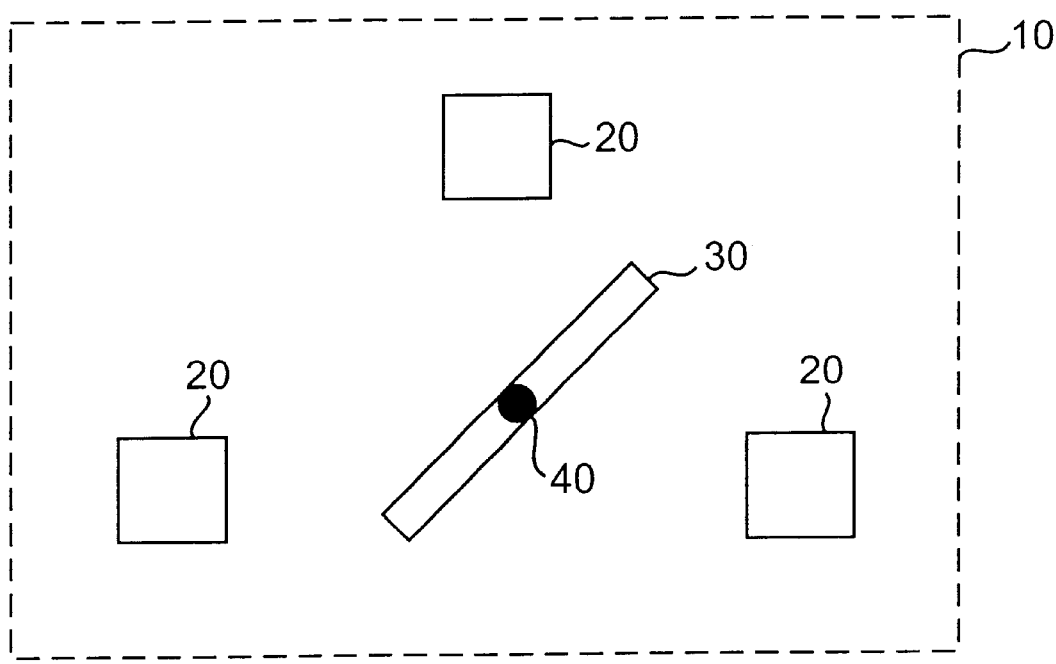
FIG. 1 depicts an electronically commutated, brushless motor having 3 stator coils and a two-pole rotor according to the prior art.

FIG. 1 depicts an illustrative DC brushless electric motor configuration according to the prior art. Referring to FIG. 1, a motor 10 includes three stator coils 20 surrounding a rotor 30 which is rigidly attached to a shaft 40. The rotor 30 includes magnetic poles 180 degrees apart which may be created using permanent magnets or using current supplied to coils within the rotor. The rotor 30 is rigidly attached to the shaft 40 and is configured to rotate around the axis of the shaft 40 thus rotating the shaft 40.

The motor 10 may be configured to include any convenient number of stator coils 20, but is shown for convenience to include three. The stator coils 20 in general remain stationary relative to the rotor. The stator coils 20 are distinct electrically conductive coils that are selectively energized in order to impart electro-motive force (EMF) between the magnetic poles of the rotor and the energized coils of the stator. During a process of "commutation," one or more of the stator coils 20 are momentarily energized in a rotating fashion around the axis of rotation of the rotor. Each sequentially energized coil exerts torque on the magnetic pole(s) of the rotor and rotates the rotor and the shaft in the desired direction. The sequence of energizing the coils 20 is structured to rotate the shaft and impart torque on it. Under low-torque operating conditions, the rate of shaft rotation is equal to the rate of rotation in energizing the stator coils.

All brushless electric motors must be commutated as described above in order to create torque and rotation on the shaft. Commutation is typically done using electronic components such as position sensors on the motor, which determine the position of the rotor relative to the stator, and a series of switches which energize the stator coils based on the rotor position. Electronic commutation is reliable but expensive and is difficult to implement when stator coil currents are high.

Figure 2:
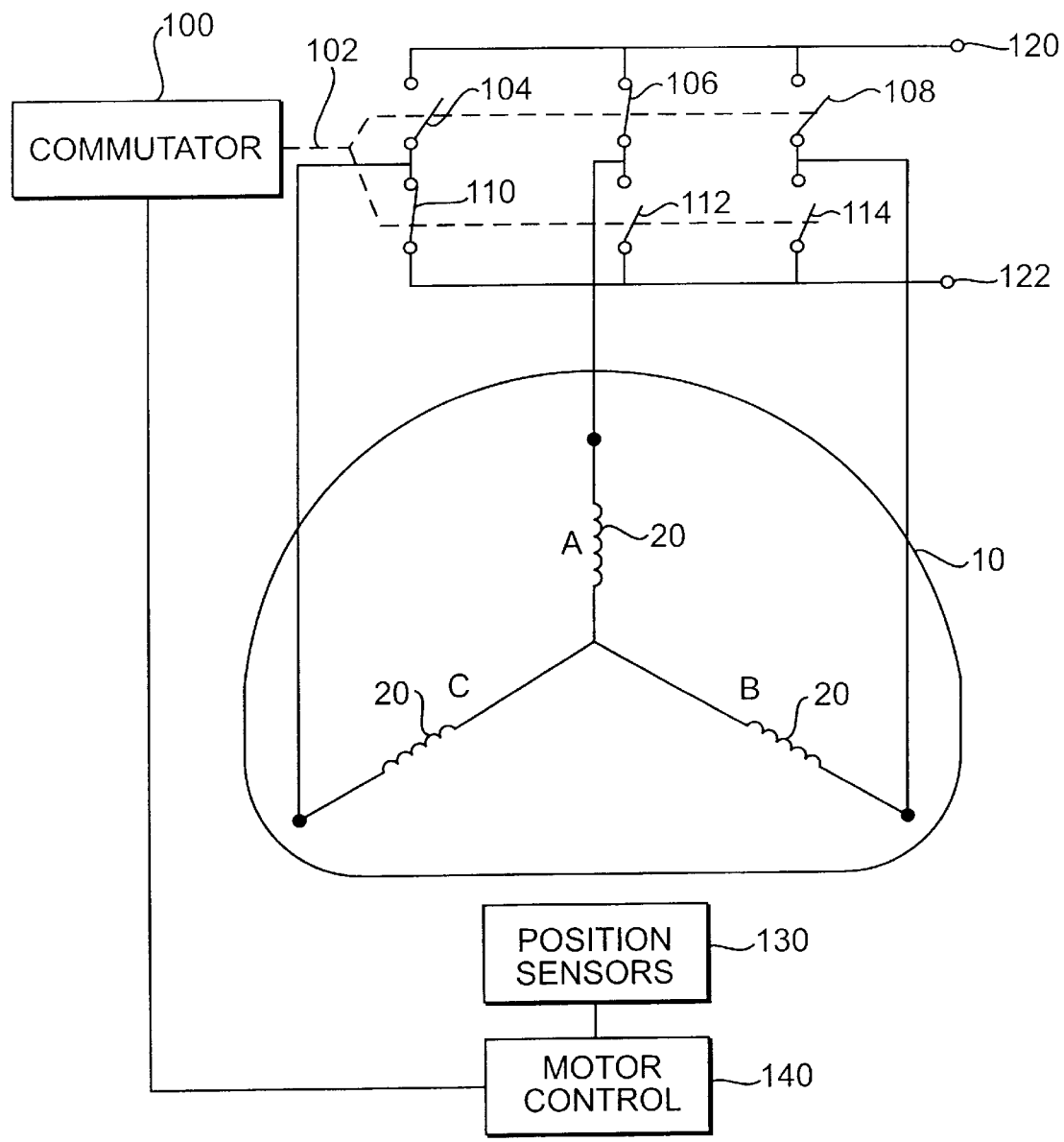
FIG. 2 depicts an electronic commutation configuration for a brushless motor having 3 stator coils and a two-pole rotor according to the prior art.

A typical electronic commutation configuration according to the prior art is depicted in FIG. 2. Referring to FIG. 2, the motor 10 is illustrated to include three stator coils 20 used to control the rotation of the rotor 30. One end of each of the stator coils is connected together. The other three ends of the three stator coils 20 are connected through switches 104–114 to a source of electrical power 120, 122. For example, 120 could be applied to a positive terminal of a power source and 122 could be applied to a negative terminal of the power source.

Position sensors 130 are used to measure the position of the rotor 30 of the motor 10 relative to the stator coils 20. The motor control logic 140 receives the output of the position sensors 130 and issues control signals to the commutator 100. The motor control logic may calculate, for example, the position, velocity or acceleration of the motor shaft 30 based on the output of the position sensors 130. The motor control logic may then output motor control signals, including a rotor position signal, to the commutator 100 for controlling the commutation of the stator coils 20.

The commutator 100 receives input from the motor control circuit and issues control signals 102 to the switches 104–114 based on the motor control signals. In order to commutate the coils 20, the commutator 100 generally closes two out of the six switches to energize a pair of coils at any given time. For example, a typical commutation sequence would be to energize the following pairs of coils 20 in sequence: BA, CA, CB, AB, AC, BC. To achieve this, the commutator must turn on the following switch pairs in sequence: 108, 112; 104, 112; 104,114; 106, 114; 106, 110; and 108, 110.

It is apparent from FIG. 2 that each pair of coils 20 is energized through two switches. One switch carries current from a first terminal into a first coil. The first coil is then connected to a second coil and the second switch carries current from the second coil to the second terminal. The switches themselves, depending on how they are implemented, may not be capable of carrying high coil excitation currents. For example, if the switches are implemented on an integrated circuit chip, the current may be severely limited. Moreover, if larger switches are used in order to carry more current to the coils the size of the switches may be undesirable and/or expensive depending on the application.

Mechanical Commutation Embodiments of the Invention

According to the present invention, a commutation assembly for mechanically commutating an electric motor is provided. The commutation assembly according to one embodiment of the invention is depicted in FIG. 3. At a high level, the commutation assembly mechanically attaches to the shaft 40 of the motor 10 and electrically attaches to the stator coils. During attachment, the commutation assembly registers the position of the rotor relative to the stator based on its geometry and mechanically connects the appropriate stator coils 20 to the appropriate electrical contacts for energizing them.

Referring to FIG. 3, the commutation assembly 200 includes an arm 210, a flexible conductive ring 220 and an outer ring 230. The outer ring includes twelve electrical contacts 250, spaced 30 degrees apart, and isolators 260 between each pair of adjacent contacts. The contacts 250 and isolators 260 form a circular inner surface having as its center the axis of the shaft 40. Each contact 250 is connected to one end of a unique stator coil 20. Each stator coil 20 is connected at its other end to a terminal of a power supply. The conductive flexible ring 220 is smaller in diameter than the diameter of the inner surface of the outer ring. It is held stationary relative to the housing of the motor 10 and is connected to the other terminal of the power supply.

The arm 210 is rigidly coupled to the shaft at its center point and has two distal ends with opposing rollers 240. The rollers 240 are electrically non-conductive and make non-sliding contact with the conductive flexible ring 220. Moreover, the rollers 240 deform the conductive flexible ring 220 and outwardly bias it so that the conductive flexible ring 220 makes mechanical and electrical contact with only two of the electrical contacts 250 at a time. This electrical contact between the conductive flexible ring 220 and each particular pair of contacts 250 causes power from the conductive flexible ring 220 to energize the corresponding pair of stator coils 20 and exert torque on the shaft 40 of the motor in the direction of rotation of the shaft.

Figure 4C:
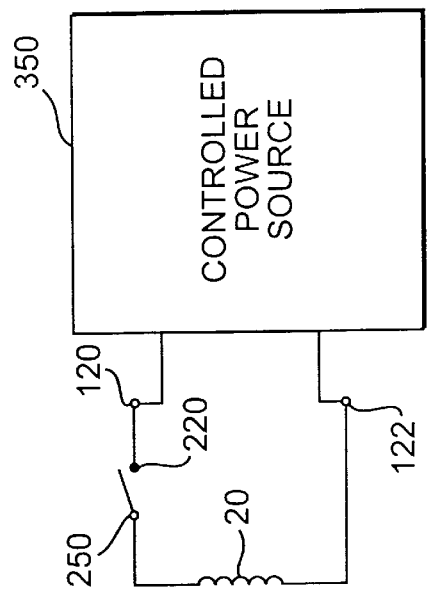
FIG. 4C depicts an embodiment of a connection between power terminals, the conductive flexible ring, an electrical contact and a stator coil according to the present invention.
Figure 4A:
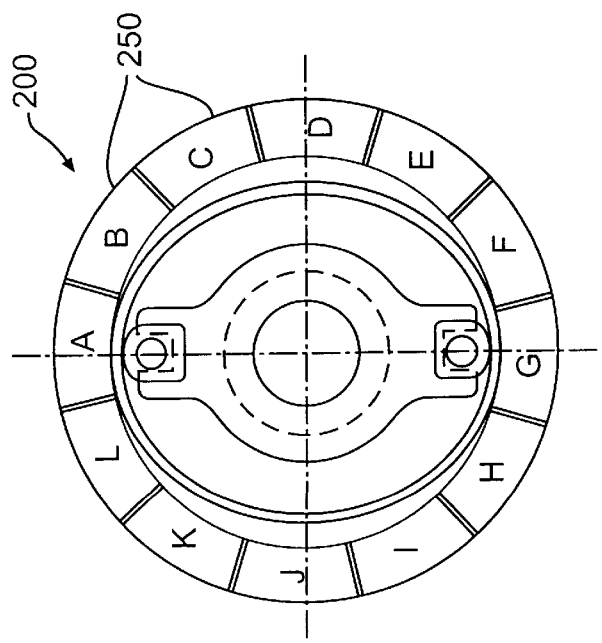
FIG. 4A depicts an embodiment of the commutation assembly according to the present invention with each electrical contact connected to one of twelve stator coils.
Figure 4B:
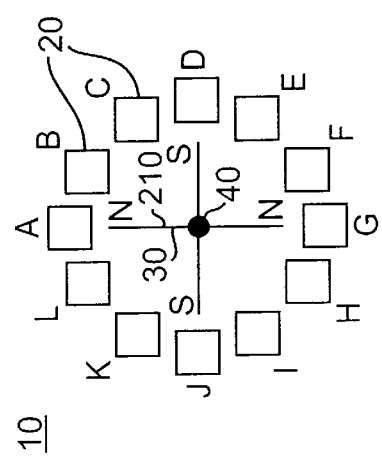
FIG. 4B depicts an embodiment of a motor having twelve stator coils and a rotor with four magnetic poles according to the present invention.

FIGS. 4A–4C illustrate the mechanical and electrical connection between the commutation assembly 200 and the motor 10. Referring to FIG. 4A, each of the twelve electrical contacts 250 is shown connected to a respective one of stator coils 20 labeled A–L. FIG. 4B illustrates the motor 10 looking into the shaft 10. The motor 10 includes the 12 distinct stator coils 20, labeled A–L, positioned around a rotor 30. The rotor 30 includes four magnetic poles—two north poles on opposing sides of the shaft 40 and two south poles on opposing sides of the shaft 40 and spaced 90 degrees apart from the north poles. The stator coils 20, when energized, exert EMF on the magnetic poles of the rotor 30.

The arm 210 is shown with the rollers aligned with the magnetic poles of the rotor 30. In general, the arm 210 should be positioned relative to the magnetic poles of the rotor such that the stator coils energized by the arm outwardly biasing the conductive flexible ring create maximum torque on the magnetic poles of the rotor.

FIG. 4C depicts the electrical connection between each coil 20, a corresponding one of the electrical contacts 250, the conductive flexible ring 220 and a controlled power source 350. Referring to FIG. 4C, each of the coils 20 is connected at one end to a terminal of the controlled power source 350. At the other end each of the coils 20 is connected to a corresponding one of the twelve electrical contacts 250. The conductive flexible ring 220 is shown connected to the other terminal of the controlled power source 350. The controlled power source 350 may be switched such that the polarity of the terminals may be changed. Moreover, the voltage or current supplied by the controlled power source 350 may be variable to adjust the position, speed, acceleration or torque of the shaft.

During operation of the motor, the arm 210 forces the conductive flexible ring 220 to come into contact with two electrical contacts 250. This creates the switched connection between the power terminal 120 and the coil 20 illustrated in FIG. 4C and causes the coil 20 to be energized. This in turn causes torque to be exerted between the energized coil 20, and the magnetic poles of the rotor 30, which causes rotation of the shaft 40 and the arm 210. When the arm moves into registration with the next pair of electrical contacts 250, the next pair of stator coils is energized. The sequence of energizing the stator coils is A, B, C, D, E, F, G, H, I, J, K, L and commutates the motor.

It will be appreciated that innumerable variations of the embodiments described with reference to FIGS. 3–4C are possible. For example, the number of contacts 250/stator coils 20 and the number of magnetic poles of the rotor may be any convenient number depending on the implementation. With respect to connecting the stator coils 20 to the controlled power source 350, a resistor may be placed in series with the power source in order to limit the maximum current drawn by the stator coils. In some embodiments, more than one commutation assembly may be operatively connected to a given motor 10. Moreover, there may be several electrically conductive rings and arms and contacts in each commutation assembly. The rotor was described to include four magnetic poles. However, one of ordinary skill in the art will appreciate that any reasonable number of poles may be implemented in the rotor.

Having described the embodiments shown in FIGS. 3–4C at a high level, the commutation assembly itself will be further described in more detail below. Referring to FIG. 3, the outer ring 230 includes a plurality of contacts 250 and isolators 260 disposed adjacent to each other around the outer ring 230. The contacts 250 include at least an electrically conductive surface 255 and a path for carrying electrical current between the electrically conductive surface 255 and a conductor connected to a stator coil 20 and/or a power source. The isolators 260 electrically isolate adjacent contacts 250 from each other.

The isolators 260 and the electrically conductive surfaces 255 of the contacts 250 should be arranged so that the outer ring 230 includes a circular inner surface, having the axis of the shaft as its center, with electrically conductive surfaces 255 that are electrically isolated from one another. The dimensions of the conductive regions and isolation between the conductive regions should be chosen to optimize transferring current to the appropriate stator coil 20 to create rotor rotation.

The conductive flexible ring is disposed within the outer ring 230. It must have a diameter that is less than the diameter of the inner surface of the outer ring 230. It is capable of conducting electrical current and may, for example, convey electrical current from one electrical contact 250 to one or more other electrical contacts 250. The conductive flexible ring may also convey current between a power source and one or more electrical contacts 250. For this purpose, the ring should have a sufficient cross-sectional area and sufficient conductivity to convey the desired amount of current without an excessive amount of resistive loss.

The conductive flexible ring 220 may be made of any conductive material that is resilient enough not to work harden or permanently deform over operating time requirements and which has a natural frequency higher than the maximum rotational frequency of the motor shaft. The ring may be made of, for example a metal or alloy. It may be coated with gold to ensure good electrical contact with the electrically conductive surfaces 255, which may be similarly coated. In one embodiment of the invention, the conductive flexible ring is made of beryllium copper (BeCu). The conductive flexible ring should be keyed to the stator, the motor housing or another member so that it does not rotate relative to the outer ring 230.

The arm 210 is rigidly coupled to the shaft 40. In general, it is important to situate the arm on the shaft so that it has a desired orientation relative to the rotor 30. The arm may include, for example a bore 212 for receiving the shaft 40. The bore may be any desired shape and may be affixed to the shaft in any convenient manner including, for example, by adhering it, welding it or fastening it with a bolt, nail, clip, key or other technique. The arm may also be integrally formed with the shaft. Any convenient attachment technique is contemplated for attaching the arm 210 to the shaft 40.

The arm includes two distal ends 214 relative to the shaft 40. The arm further include a roller 240 situated at each distal end. The roller 240 may be a pin mounted bearing or bushing. The surface of the roller which contacts the conductive flexible ring 220 should be electrically non-conductive to electrically isolate the rotating shaft.

The dimensions of the arm, and in particular the distance of the distal surface of the roller from the central axis of the shaft, is important. In general, this distance should be set approximately equal to the radius of the inner surface of the outer ring 230 minus the thickness of the conductive flexible ring 220. When there are two distal ends 214 of the arm 210, as illustrated in FIG. 3, this permits the rollers of the arm to force the conductive flexible ring 220 into mechanical contact with the inner surface of the outer ring 230 in the region between the roller and the outer ring 230. When the inner surface is an electrically conductive surface 255, the conductive flexible ring makes mechanical and electrical contact with it. Moreover, because the diameter of the conductive flexible ring 220 is less than the diameter of the outer ring 230, the conductive flexible ring only makes mechanical and electrical contact with the inner surface of the outer ring where it is forced between a roller 240 and the inner surface of the outer ring 230. This arrangement permits application of electrical current to select ones of the contacts 250, and therefore to select stator coils 20, based on the position of the arm, and therefore the rotor, relative to the stator.

FIG. 3b illustrates a cross-sectional view of an embodiment of the commutation assembly through the arm and along the axis of the shaft. FIG. 3b illustrates recess 270 in the distal ends 214 for the rollers. Also shown are an attachment region 280 of the arm 210. The attachment region 280 surrounds the shaft 40 and may include one or more threaded bores 290 for receiving a bolt to fasten the arm 210 to the shaft 40. Also illustrated in FIG. 3b is the interface between the rollers 240, the conductive flexible ring 220 and the electrically conductive surface 255. The contact 250 further includes a connection between the electrically conductive surface 255 and the conductor 295 which are connected to a distinct motor coil.

Ring Confinement Embodiments

It should be further noted that many different embodiments of the relationship between the conductive flexible ring 220, the arm 210 and the inner surface of the outer ring 230 are contemplated. The conductive flexible ring 220 must be positionally constrained to prevent it from rotating about the axis of the shaft and prevent it from moving along the axis of the shaft. This may be done in many different ways including constraining the ring from the motor case, non-rotating portions of the mechanical commutation assembly and/or the rollers.

For example, the inner surface of the conductive flexible ring 220 may have inwardly protruding edges to define a track for the rollers 240. This constrains movement of the conductive flexible ring along the shaft. In this scenario, the edges of the track would be electrically non-conductive. Alternatively, the conductive flexible ring 220 may include a circumferential, central slot in which the rollers ride to keep the flexible ring from moving along the axis of the shaft. The conductive flexible ring and the roller may include mating teeth. Moreover, although the arm has been illustrated with two distal ends bringing the conductive flexible ring 220 into contact with the inner surface of the outer ring 230, embodiments, may be desired where only one or three or more distal ends contact the inner surface. When only one distal end forces contact between the conductive flexible ring and the inner surface, the arm may include at least one other roller at an opposing end for outwardly biasing the conductive flexible ring, even through the additional rollers do not force contact between the conductive flexible ring 220 and the inner surface of the outer ring.

Methods of attachment of the Mechanical Commutation Assembly to the Motor

The commutation assembly, or multiple commutation assemblies, may be operatively connected to a motor 10 in any convenient manner. In general, the outer ring 230 is fixed relative to the stator coils 20. This may be accomplished by attaching it to the motor housing internal or external to the motor housing. Attachment may also be accomplished by securing the outer ring to a platform to which the motor 10 is also attached. During attachment, the outer ring should be situated relative to the motor 10 such that the center of the inner circular surface of the outer ring has as its center the central axis of the shaft.

The arm 210 is attached to the shaft and should be either fixed at a desired angular offset relative to the rotor or should be fixed and the desired angular offset measured. In the latter scenario, the outer ring should be positioned relative to the stator prior to affixing it to the motor so that the angular position of the electrically conductive surfaces 255 relative to the stator coils accounts for the angular offset between the arm and the rotor. The goal is to align the electrically conductive surfaces 255 relative to the stator coils 20 and the arm 210 relative to the rotor so that as the arm and rotor rotate at the same angular velocity, the arm sequentially forces electrical contact with each of the electrically conductive surfaces 255 to sequentially energize the stator coils 20 and commutate the motor 10. To accomplish commutation, the electrical contacts 250 of the outer ring should be connected to the appropriate stator coils 20 over conductors 295 so that the stator coils 20 are energized in the proper sequence to ensure commutation. Electrical connection over, for example, a conductor 297 may also be accomplished to deliver power to the conductive flexible ring 255 or to deliver current from the conductive electrical ring to control logic or switches.

When the commutation assembly is attached to the motor 10 as described above, commutation and operation of the motor 10 is as follows. In the off state, the arm of the commutation assembly (and the rotor) is stopped relative to the outer ring (and the stator). In the stopped position, the roller at the distal end of the arm 210 forces mechanical and electrical contact between the conductive flexible ring 220 and at least one of the electrically conductive surfaces 255. When power is applied to the motor 10, and it may be applied in controlled amounts, the stator coils 20 are energized based on which electrically conductive surface 255 is in contact with the conductive flexible ring 220. Energizing the stator coils 20 creates EMF between the energized coils and the magnetic poles of the rotor 30. This causes the rotor 30 and therefore the arm 210 to rotate.

As the arm 210 rotates about the axis of the shaft 40 and in unison with the rotor 30, the conductive flexible ring 220 sequentially moves out of contact with one electrically conductive surface 255 and into contact with the next electrically conductive surface 255. This transition causes a new pair of stator coils 20 to energize which exerts additional torque on the rotor 30 and causes further rotation of the rotor 30 in the desired direction. This is repeated as the arm 210 and the rotor 30 trace a 360 degree rotation about the axis of the shaft to accomplish commutation. The acceleration, velocity and position of the shaft may be controlled by adjusting the level of power applied to the rotor. At higher power levels, the acceleration of the shaft is correspondingly higher during motor startup and the peak velocity is also correspondingly higher. Reversing the power connection will reverse the direction of the motor.

Multiple Commutation Assembly Embodiments

Figure 5:
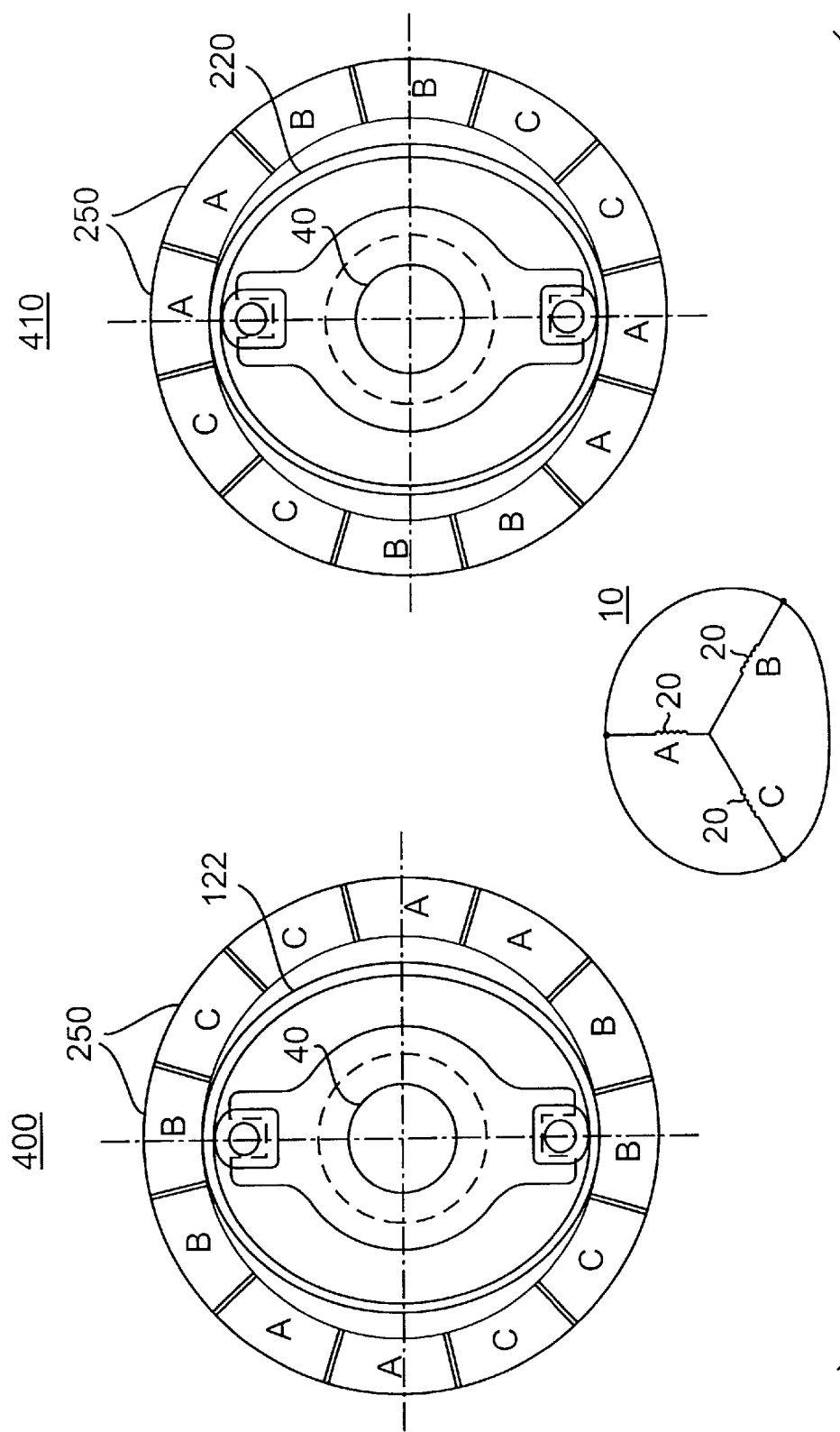
FIG. 5 depicts an illustrative variation where two commutation assemblies are used on a shaft to mechanically commutate a brushless motor according to an embodiment of the present invention.

FIG. 5 depicts an embodiment with two commutation assemblies 400 and 402 positioned on the same shaft. The first commutation assembly 400 has its conductive flexible ring 220 coupled to one terminal of a power source, terminal 122, and the second commutation assembly 410 has its conductive flexible ring 220 connected to the other terminal of the power source, terminal 120. The motor 10 includes 3 stator coils 20. Each commutation assembly is configured as shown in FIG. 4 to include an outer ring 230 having 12 contacts 250 and an arm 210 with two distal ends for forcing contact between the conductive flexible ring 220 of each commutation assembly and the corresponding inner surface of each outer ring 230.

Referring to FIG. 5, each contact 250 is shown connected to either stator coil A, B, or C of the motor 10 which is also depicted. The arms 210 of each commutation assembly 400 and 402 are aligned and rotate around the axis of the same shaft 40. As the shaft 40 rotates the arm through a full rotation, it will be noted that pairs of coils are energized in the following sequence: BA, CA, CB, AB, AC, BC. This is the same commutation sequence as the elaborate electronic commutation arrangement of FIG. 2 except it is accomplished mechanically and without switches in the coil energizing path. Thus, high coil excitation currents are possible and the complexity of the motor electronics are reduced.

While particular embodiments of the present invention have been described, it will be appreciated by one of ordinary skill in the art that changes may be made to those embodiments without departing from the spirit and scope of the invention.

What is claimed is:

1. A commutation assembly for mechanically commutating a brushless electric motor, comprising:
   a plurality of distinct electrical contacts forming a circular surface having a first circumference, each contact being electrically connectable to distinct coils within a motor;
   a conductive flexible ring having a second circumference that is less than the first circumference of the circular surface; and
   an arm attachable to the motor shaft, the arm having a roller disposed at a distal end for forcing an electrical connection between the flexible ring and at least one of the electrical contacts during rotation of the arm;
   wherein the electrical connection causes at least one of the distinct coils to be selectively energized during operative attachment of the assembly to the motor.

2. The commutation assembly according to claim 1, wherein the roller makes substantially non-sliding contact with the flexible ring.

3. The commutation assembly according to claim 1, wherein the roller comprises one of a bearing or a bushing.

4. The commutation assembly according to claim 1, wherein the flexible ring comprises BeCu.

5. The commutation assembly according to claim 1, further comprising an electrical contact for coupling the flexible ring to a source of electrical power.

6. The commutation assembly according to claim 1, wherein the conductive flexible ring is constrained to prevent rotation.

7. A method of commutating an electric motor, comprising the step of:
   providing a plurality of distinct electrical contacts forming a circular surface having a first circumference around a motor shaft;
   coupling at least some of the electrical contacts to distinct coils within the motor;
   providing a conductive flexible ring having a second circumference that is less than the first circumference of the circular surface; and
   attaching an arm to the motor shaft, the arm having a first roller disposed at a distal end for forcing an electrical connection between the flexible ring and at least one of the electrical contacts during rotation of the arm and causing at least one of the distinct coils to be selectively energized during motor operation.

8. The method according to claim 7, wherein the first roller makes substantially non-sliding contact with the flexible ring.

9. The method according to claim 7, wherein the first roller is a pin and wheel assembly.

10. The method according to claim 7, wherein the flexible ring comprises BeCu.

11. The method according to claim 7, further comprising an electrical contact for coupling the flexible ring to a source of electrical power.

12. The method according to claim 7 wherein the arm is secured to the shaft substantially at its mid-point and further comprises a second roller disposed at the opposing end of the arm from the first roller.

13. A brushelss, mechanically commutated motor, comprising:
   a plurality of stator coils, each coupled on one side to a power terminal;
   a rotor having magnetic poles;
   a plurality of distinct electrical contacts forming a circular surface having a first circumference around the rotor, at least some of the electrical contacts being electrically coupled to distinct ones of the stator coils on the other side;
   a conductive flexible ring coupled to another power terminal, the conductive flexible ring having an outer circumference that is less than the first circumference of the circular surface; and
   an arm attached to the rotor, the arm having rollers disposed at opposing ends forcing an electrical connection between the flexible ring and at least one of the electrical contacts during rotation of the arm;
   wherein upon application of power to the power terminals, the electrical connection energizes the distinct coils to impart torque on the rotor.

14. The brushless, mechanically commutated motor according to claim 13, wherein the arm is aligned relative to the magnetic poles of the rotor.

15. The brushless, mechanically commutated motor according to claim 13, wherein the conductive flexible ring comprises BeCu.

16. The brushless, mechanically commutated motor according to claim 13, wherein the rotor includes four magnetic poles.

17. The brushless, mechanically commutated motor according to claim 13, wherein the power source is controllable to change the polarity of the power terminals.

18. The brushless, mechanically commutated motor according to claim 13, wherein the power source is controllable to change the voltage on the power terminals.

19. The brushless, mechanically commutated motor according to claim 13, wherein the conductive flexible ring is constrained to prevent rotation.

20. The brushless, mechanically commutated motor according to claim 13, wherein the conductive flexible ring is constrained to prevent substantial movement along an axis of the rotor.

* * * * *